Nov. 10, 1953  F. W. CAWTHON  2,658,560
ARMREST
Filed Feb. 21, 1951

INVENTOR
FRANK W. CAWTHON

BY *Brown & Blodgett*

AGENTS

Patented Nov. 10, 1953

2,658,560

UNITED STATES PATENT OFFICE 2,658,560

ARMREST

Frank W. Cawthon, Weirsdale, Fla.

Application February 21, 1951, Serial No. 212,078

6 Claims. (Cl. 155—112)

This invention relates to arm rests and more particularly to an arm rest for use in an automobile.

It is an object of this invention to provide a light weight armrest for use in an automobile, which armrest may be folded when not in use.

It is another object of the present invention to provide an armrest which, while remaining attached to a seat, can be folded to a compact inoperative position and yet can be easily and quickly expanded to its operative position.

It is still another object of the present invention to provide an armrest that may be fabricated from standard stock materials and involves no special castings or machined parts.

Another object of the present invention is to provide an armrest to be used with an automobile seat which armrest is fastened by making use of features common to all such seats.

It is a further object of this invention to provide an armrest which, when used with an automobile seat, requires no modification of the seat and will not damage the upholstery.

With these and other objects in view, as will be apparent to those skilled in the art, the invention resides in the combination of parts set forth in the specification and covered by the claims appended hereto.

The character of the invention, however, may be best understood by reference to certain of its structural forms, as illustrated by the accompanying drawings in which.

Like reference characters denote like parts in the several figures in the drawings.

In driving an automobile for a great distance, the driver usually finds that his inner, or right arm gets very tired. This is because he must hold the steering wheel with that hand and there is no way in which the arm can be supported; usually the left arm is provided with an armrest attached to the door, but no such provision is made for the right arm. Means have been provided in the past for supporting the right arm, but they have all suffered from difficulties that detracted from their usefulness. Among these difficulties are the following which apply to prior art armrests in varying degrees: they are bulky and not easily stored when not in use, they are heavy, they are attached to the automobile seat in such a manner as to damage the upholstery, and they are necessarily of expensive construction. Furthermore, in most cases, it is not possible to fold them out of the way while maintaining them attached to the seat ready to be unfolded for use. The present invention obviates these difficulties in prior art devices in a manner which will be evident from the following description.

Figure 1:
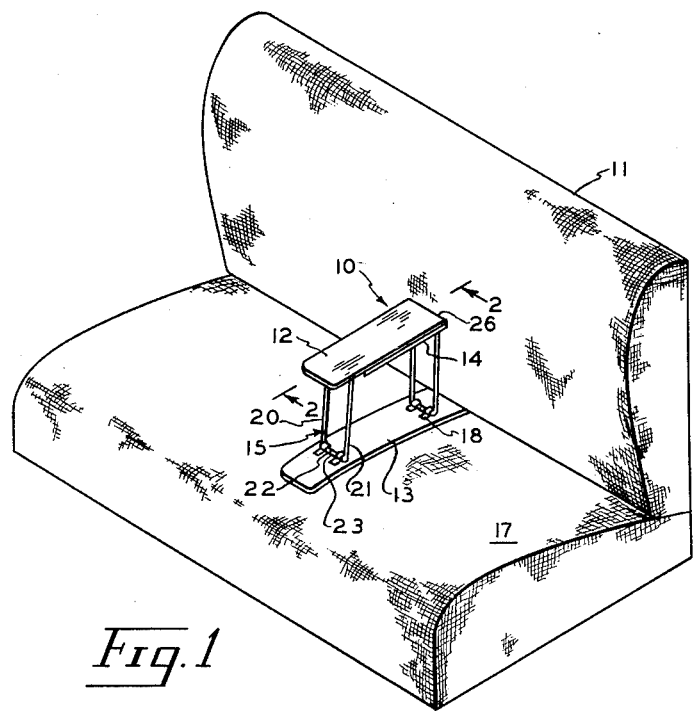
Figure 1 is a perspective view of the armrest of the invention shown in place on the seat of an automobile.

In Figure 1, which best shows the general features of the invention, the armrest, designated by the reference character 10, is shown in use with the front seat 11 of an automobile. The armrest 10 comprises an upper member 12, a lower member 13, a hinge plate 14, a forward upright 15, and a rear upright 16. The lower member 13 is made from sheet plastic or steel and is of a generally elongated rectangular shape. The lower member is bent to a permanent arcuate form and has a radius of curvature such as to conform to the upper surface 17 of an automobile seat. Furthermore, the lower member is long enough to extend from back to front of the seat and is of a width sufficient for stability. The lower member 13 is formed with four hinge loops 18 which are punched from the body of the member and are raised above the surface thereof. These hinge loops are formed in pairs and each pair is situated inwardly of its respective end of the member. The loops in each pair are aligned to receive a portion of an upright, as will be described.

The forward upright 15 is formed from a single piece of steel rod, or the like, and is bent in the shape of a rectangle. More specifically, the piece of rod is bent into a U-shape and the legs of the U are bent inwardly to form a rectangle. Thus, the upright 15 comprises a bight 19, side members 20 and 21, and inwardly extending bales 22 and 23. The bales 22 and 23 lie within the forward loops 18 of the lower member 13 so as to form a hinge therewith. The rear upright 16 is constructed in exactly the same manner as the forward upright, but is slightly longer. The bales of the rear upright lie within the rearward pair of loops 18 of the lower member and are free to turn therein when the upright is rotated toward the lower member.

The hinge plate 14 is of a generally elongated rectangular shape and is formed at its ends with hinge loops 24 and 25, respectively. The plate is approximately as long as the distance between the pairs of loops 18 on the lower member. The bight 19 of the forward upright 15 lies within the hinge loop 24, while the corresponding bight of the rear upright 16 lies within the hinge loop 25. Thus, the lower member, the two uprights, and the hinge plate approximate a parallelogram in any position of relative movement; this is, of course, not altogether true because of the fact that the rear upright is slightly longer than the forward upright.

Attached to the upper surface of the hinge plate is the upper member 12. The upper member is formed of sheet material and is of a generally elongated rectangular shape. It is fastened to the hinge plate by welding or cementing, depending on the material used in their construction. The upper member is considerably longer than the hinge plate and shorter than the lower member, as is evident from the drawings, and is attached to the hinge plate in such a manner that its back end 26 is flush with the back end of the hinge plate. The forward end, however, extends over the forward end of the hinge plate a considerable distance.

Figure 2:
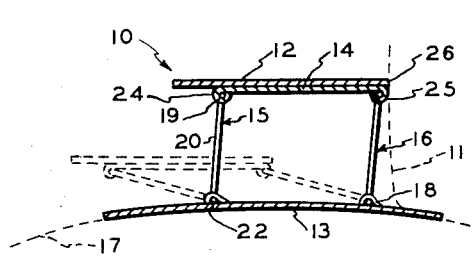
Figure 2 is an enlarged sectional view of the invention taken on the line 2—2 of Figure 1 and looking in the direction of the arrows. The condition of the invention between its folded, inoperative position and its unfolded, operative position is shown in dotted lines.
Figure 3:
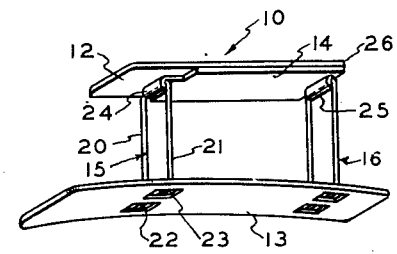
Figure 3 is a perspective view of the armrest of the invention viewed from underneath.

The use and operation of the present invention is as follows:

The lower member 13 is laid on the top surface 17 of the automobile seat and its rear end is inserted between the seat and its back, as shown in Figure 2. The pressure between the two parts of the seat pinches the end of the lower member and holds it in conformance with the surface of the seat. In operative position, the uprights 15 and 16 are generally vertical while the upper member is horizontal and has its rear end 26 pressed against the back of the seat. The pressure of the driver's arm on the upper member is downwardly and rearwardly and serves to press the end 26 even more tightly against the back of the seat for a resultant increase in stability. The forward upright 15 is made shorter than the rear upright 16 to compensate for the fact that in most automobiles the surface 17 of the seat inclines upwardly from the back to the front; the upper member can, thus, be held in a generally horizontal position. When the armrest is not needed, a forward pressure on the upper member moves the parts into the folded position shown in dotted lines in Figure 2.

It is obvious that minor changes may be made in the form and construction of the invention without departing from the material spirit thereof. It is not, however, desired to confine the invention to the exact form herein shown and described, but it is desired to include all such as properly come within the scope claimed.

Having thus described the invention, what is claimed as new and desired to secure by Letters Patent is:

1. An armrest for use with an automobile seat having a seat portion and a back portion, comprising: an elongated lower member adapted to lie along the surface of the seat portion and to be clamped at one end between the seat portion and the back portion, two uprights hingedly attached at each end, respectively, to said lower member, an elongated upper member hingedly attached to the other ends of said uprights and adapted to assume a horizontal position spaced from said lower member and to press at one end against the said back portion of the seat, one of the said uprights being slightly shorter than the other.

2. An armrest for use with an automobile seat having a seat portion and a back portion, comprising: an elongated rectangular lower member formed of sheet material and adapted to lie along the surface of the seat portion with one end clamped between the seat portion and the back portion, a forward upright formed of rod material in a rectangular shape hingedly attached at one end to the forward portion of said lower member, a rear upright of a construction similar to but slightly longer than the forward upright hingedly attached at one end to the rearward portion of said lower member, an elongated rectangular upper member formed of sheet material and having a length somewhat less than that of the lower member, the other ends of said uprights being hingedly attached to said upper member at points which are the same distance apart as the points of attachment to the lower member.

3. An armrest as recited in claim 2, wherein: the attachment of the said one ends of the uprights to said lower member is brought about by means of hinge loops punched from the lower member and bales on said uprights which lie within the loops.

4. An armrest as recited in claim 2, wherein: the attachment of the said other ends of said uprights to said upper member is brought about by means of a hinge plate attached to and coextensive with the upper member and having hinge loops formed in the ends thereof, bight portions of said uprights lying within the hinge loops.

5. An armrest, comprising: an elongated rectangular lower member formed of sheet material curved slightly to conform to the upper surface of an automobile seat and of a length to be coextensive therewith, two pairs of hinge loops formed from the lower member, each pair being situated adjacent an end thereof, two uprights formed from rod material into generally rectangular forms, portions of which reside within said hinge loops, one of said uprights being slightly shorter than the other, a hinge plate formed of sheet material and of a length approximately equal to the distance between the said pairs of loops, said hinge plate being formed with loops at the ends thereof, said loops enveloping portions of said uprights to form a hinged connection therewith, an upper member of generally elongated rectangular form attached to said hinge plate and extending forwardly, but not rearwardly thereof.

6. An armrest for use with an automobile seat having a generally horizontal seat portion and a generally vertical back portion, comprising: a flat, generally rectangular lower member adapted to lie on the seat portion with its rearward end clamped between the seat portion and the back portion of the seat, a first upright hingedly attached to the lower member adjacent the forward end thereof, a second upright slightly larger than the first upright hingedly attached to the lower member in a portion thereof substantially removed from the rearward end thereof, a flat, generally rectangular upper member hingedly attached to the other ends of the uprights, the portion of the upper member to which the second upright is attached being closer to the rearward end thereof than is the corresponding portion of the lower member, whereby the rearward end of the upper member is adapted to press against the back portion of the seat when the uprights are in a substantially vertical position.

FRANK W. CAWTHON.

References Cited in the file of this patent

UNITED STATES PATENTS

| Number | Name | Date |
|---|---|---|
| 78,250 | Withey | May 26, 1868 |
| 238,979 | Smith | Mar. 15, 1881 |
| 544,821 | Morrison | Aug. 20, 1895 |
| 557,063 | Faneuf | Mar. 24, 1896 |
| 2,545,545 | Drake | Mar. 20, 1951 |

FOREIGN PATENTS

| Number | Country | Date |
|---|---|---|
| 203,258 | Germany | Oct. 22, 1908 |